(12) United States Patent
Schwarz et al.

(10) Patent No.: US 11,007,445 B2
(45) Date of Patent: May 18, 2021

(54) TECHNIQUES FOR CURATION OF VIDEO GAME CLIPS

(71) Applicant: Lenovo (Singapore) Pte. Ltd., Singapore (SG)

(72) Inventors: David Alexander Schwarz, Morrisville, NC (US); John Weldon Nicholson, Cary, NC (US); Barrett Bryson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 32 days.

(21) Appl. No.: 16/543,150

(22) Filed: Aug. 16, 2019

(65) Prior Publication Data

US 2021/0046388 A1 Feb. 18, 2021

(51) Int. Cl.
*A63F 13/86* (2014.01)
*A63F 13/335* (2014.01)
*A63F 13/35* (2014.01)

(52) U.S. Cl.
CPC ............ *A63F 13/86* (2014.09); *A63F 13/335* (2014.09); *A63F 13/35* (2014.09)

(58) Field of Classification Search
CPC ......... A63F 13/35; A63F 13/86; A63F 13/335
See application file for complete search history.

(56) References Cited

U.S. PATENT DOCUMENTS

| | | | | |
|---|---|---|---|---|
| 10,300,394 B1* | 5/2019 | Evans | ..................... | G06F 3/048 |
| 2003/0157985 A1* | 8/2003 | Shteyn | ..................... | A63F 13/79 |
| | | | | 463/42 |
| 2011/0107220 A1* | 5/2011 | Perlman | ............... | H04N 19/107 |
| | | | | 715/720 |
| 2012/0071246 A1* | 3/2012 | Thomas | .................. | A63F 13/67 |
| | | | | 463/43 |
| 2012/0100910 A1* | 4/2012 | Eichorn | .......... | H04N 21/43615 |
| | | | | 463/31 |
| 2013/0159375 A1* | 6/2013 | Perry | .................... | A63F 13/335 |
| | | | | 709/201 |
| 2014/0187323 A1* | 7/2014 | Perry | ...................... | A63F 13/10 |
| | | | | 463/31 |
| 2015/0057086 A1* | 2/2015 | Thomas | .................. | A63F 13/42 |
| | | | | 463/42 |
| 2015/0224408 A1* | 8/2015 | Hayashida | ............ | A63F 13/497 |
| | | | | 463/31 |
| 2016/0001183 A1* | 1/2016 | Harvey | ................. | A63F 13/798 |
| | | | | 463/4 |
| 2016/0182956 A1* | 6/2016 | Kim | ...................... | A63F 13/795 |
| | | | | 725/32 |
| 2016/0317933 A1* | 11/2016 | Shoshan | ................. | A63F 13/79 |
| 2017/0228600 A1* | 8/2017 | Syed | ...................... | G06K 9/325 |
| 2017/0270128 A1* | 9/2017 | Smith | ................. | G06F 16/9535 |

* cited by examiner

*Primary Examiner* — Steve Rowland
(74) *Attorney, Agent, or Firm* — John M. Rogitz; John L. Rogitz

(57) ABSTRACT

In one aspect, a device includes at least one processor and storage accessible to the at least one processor. The storage may include instructions executable by the at least one processor to analyze a user's gameplay of a video game and to curate one or more video clips based on the user's gameplay. The video game clips may be curated based on player input to an input device, player audio from a microphone, and/or player video from a camera.

19 Claims, 7 Drawing Sheets

"ZOMBIE INVASION" CLIPS — SWITCH GAMES — 402, 430

CUSTOM SEARCH: ____ 428

| THUMBNAIL | TIME/DATE 409 | PLAYER 411 | LOCATION 413 | KILLSHOT 415 | COMBO 417 | OTHER HIGHLIGHTS 423 | MONTAGE 425 | OTHER ATTACKS 427 |
|---|---|---|---|---|---|---|---|---|
| 406 | 7/7 @7:30PM | JOHN | DAVID'S HOUSE MORRISVILLE, NC | HEAD (BOSS) | → ↓ Ⓐ 418 | WIN | PLAY ALL SIMILAR | N/A |
|  | 7/7 @7:23PM | JOHN | DAVID'S HOUSE | HEAD (MINION) | ← ↙ Ⓐ 420 | WIN CELEBRATION | PLAY "BEST OF" | N/A |
|  | 7/7 @7:21PM | JOHN | DAVID'S HOUSE | HEAD (BOSS) | ← Ⓐ | FUNNY | PLAY ALL HEAD KILL SHOTS FROM THIS WEEK | N/A |
| 406 | 7/6 @5:01PM | DAVID | DAVID'S HOUSE | CHEST (BOSS) | ↑ ↑ Ⓒ 418 | DAVID CAN'T CONTAIN HIMSELF | PLAY ALL CHEST SHOTS | N/A |
|  | 7/6 @4:30PM | DAVID | DAVID'S HOUSE | N/A (LOSS) | ↑ ↑ Ⓒ 420 | JOHN THROWS HIS CONTROLLER DOWN | PLAY ALL OF JOHN'S FRUSTRATING MOMENTS | LEG |
|  | 7/5 @10:02AM | JOHN | RALEIGH, NC | N/A (LOSS) | ← → Ⓑ 416 | HIGH-ACTION LOSS | PLAY ALL WITH THIS BUTTON COMBO | DOUBLE FACE PUNCH 426 |

TECHNIQUES FOR CURATION OF VIDEO GAME CLIPS

FIELD

The present application relates to technically inventive, non-routine solutions that are necessarily rooted in computer technology and that produce concrete technical improvements. In particular, the present application relates to curation of video game clips.

BACKGROUND

Video game use is increasing in magnitude and popularity. In fact, many people now spend their free time watching other people play video games as opposed to actually playing themselves. As recognized herein, while these people and the players themselves can watch gameplay in real time or after the fact, there may be instances where a person may wish to view specific instances or features of gameplay after the fact but does not have the ability to do so in any meaningful and efficient way. There are currently no adequate solutions to the foregoing computer-related, technological problem.

SUMMARY

Accordingly, in one aspect a device includes at least one processor and storage accessible to the at least one processor. The storage includes instructions executable by the at least one processor to analyze a user's gameplay of a video game and to generate one or more searchable video clips based on the user's gameplay.

The analysis of the user's gameplay of the video game may include analysis of user inputs received via an input device. In such examples, the instructions may be executable to analyze the user inputs received via the input device by associating similar input sequences that are identified from the user inputs and make video clips of the similar sequences searchable by input sequence. Each similar input sequence may include plural inputs received within a threshold non-zero time of each other.

Additionally or alternatively, in some examples the analysis of the user's gameplay of the video game may include analysis of audio from the user detected via a microphone. At least one of the searchable video clips may then be generated based on identification from the audio of laughter, based on identification from the audio of a positive exclamation by the user, and/or based on identification from the audio of a negative exclamation by the user.

Still further, in some implementations at least one of the searchable video clips may include video from the perspective of a first video game character different a second video game character controlled by the user. In these implementations, the first video game character may be a character controlled by another person besides the user.

Also in some examples, the one or more video clips may be searchable by one or more of kill shot, attacking a particular area of an opponent's body, moments the user prevails against a video game opponent, moments the user does not prevail against a video game opponent, amusing or funny moments, and/or montages thereof.

In certain implementations, the analysis may be performed using at least one artificial neural network. Also in certain implementations, the searchable video clips may be generated based on the user being active or participating in sequences of events, where the searchable video clips may not include sequences of events where the user was not active or participating.

In another aspect, a method includes analyzing, using a device, data of a user playing a video game and making video clips of the user's gameplay searchable based on the analysis.

In certain examples, the data may include data from an input device used to play the video game, where the input device may be a video game controller, a keyboard, and/or a mouse. Also in certain examples, the data may include data indicating sounds from the user as detected via a microphone and/or data from a camera imaging the user while controlling a character of the video game.

In still another aspect, a computer readable storage medium (CRSM) that is not a transitory signal may include instructions executable by at least one processor to curate video game clips based on analysis of player input to an input device, player audio from a microphone, and/or player video from a camera.

In some implementations, the analysis may include analysis, using at least one artificial neural network, of similar player input sequences to an input device, where the curation may include grouping together the video game clips of the similar player input sequences.

The details of present principles, both as to their structure and operation, can best be understood in reference to the accompanying drawings, in which like reference numerals refer to like parts, and in which:

BRIEF DESCRIPTION OF THE DRAWINGS

FIG. 4 shows an example graphical user interface (GUI) for searching curated gameplay videos and other data in accordance with present principles;

DETAILED DESCRIPTION

Figure 1:
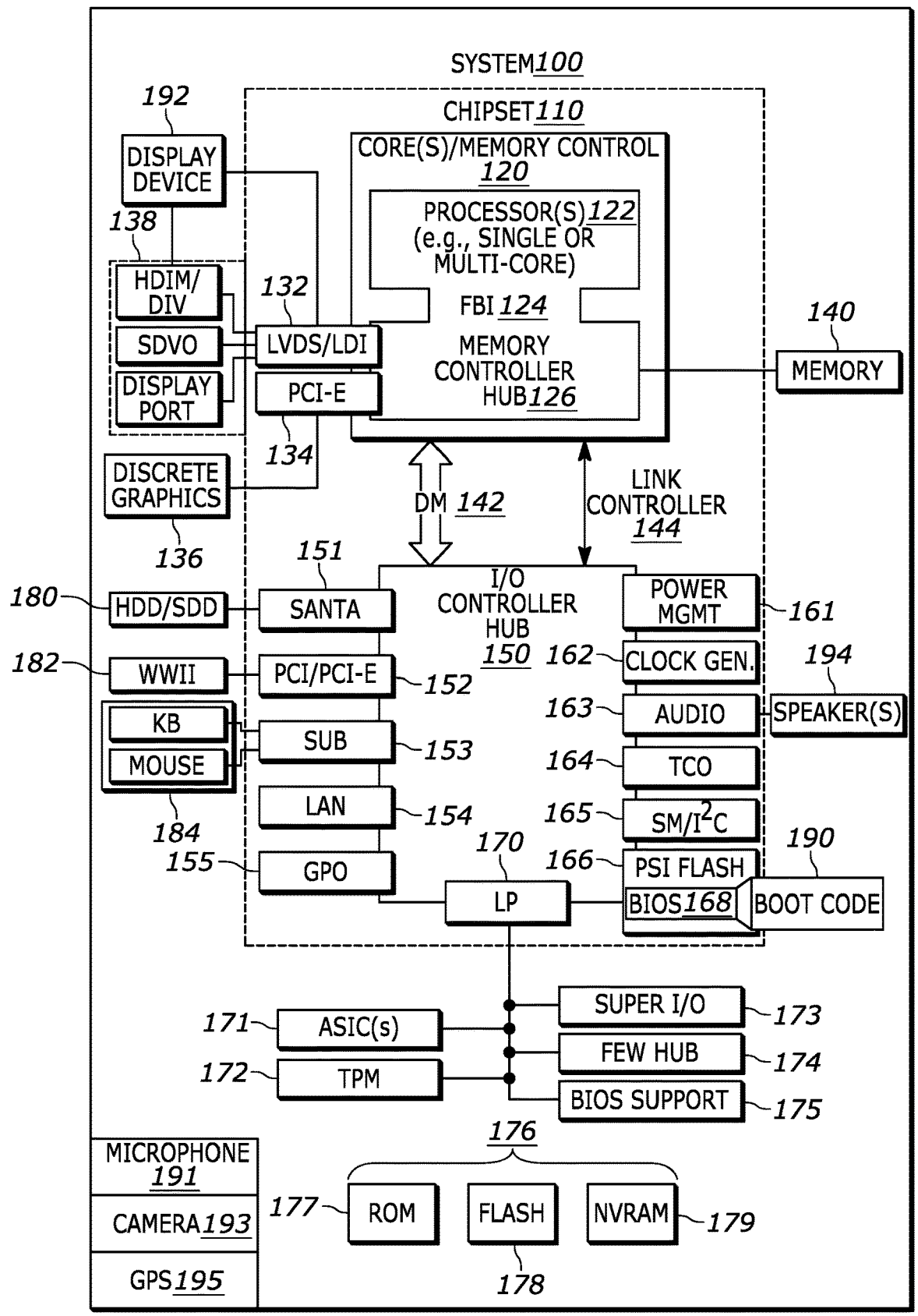
FIG. 1 is a block diagram of an example system in accordance with present principles.

Certain aspects of the present application deal with concepts related to combining a set of artificial intelligence agents that may be trained specifically on a markup of video game-related content using audio, video, and even player input as features for generating useful and searchable content. That content may include video clips of gameplay, "killshot" video clips where a player showed exceptional gaming skill, and montages of video clips. The game may be an augmented or virtual reality game as well as a more traditional type of game presented on a television display or desktop computer display. The AI model may be comprised of multiple machine learning/artificial intelligence techniques to enable its features, from simple search to an advanced neural network. Furthermore, in some examples the AI model may be trained on a few different games all of the same class (or having the same player movement mechanics) and then used to produce searchable content on a different game of the same class for which the AI model has not been trained.

To assist with the forgoing, different data formats for gameplay captures may be used. Those formats may include video, audio, and also controller and/or keyboard/mouse input (e.g., polled at least at 500 Hz).

The present application may thus enable features such as computer discernment between action sequences where the user was active and action sequences that were driven by other players so that the latter may not be included in a search related to the user. E.g., in a fighting game, the user could search all the videos where that user executed a particular "combo" (sequence of inputs) within a specific time frame that is determined to not be random and therefore is something to highlight to the user. As another example, in a shooting game, the platform may organize a montage with "killshots" performed by the user. As yet another example, a "play of the game" tailored to each specific user may be produced and presented to the respective user. In some examples, the platform may even search and organize moments of victory for the user, regardless of game so that moments of victory where the user prevailed in multiple different games are aggregated and presented together.

Prior to delving into the details of the instant techniques, with respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino, Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice, video game controllers, and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone 191 to the processor 122 based on audio that is detected, such as via a user providing audible input to the microphone. The system 100 may also include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Also, the system 100 may include a GPS transceiver 195 that is configured to communicate with at least one satellite to receive/identify geographic position information and provide the geographic position information to the processor 122 consistent with present principles, such as to determine a location at which a particular video game player is playing a video game. However, it is to be understood that another suitable position receiver other than a GPS receiver may be used in accordance with present principles to determine the location of the system 100.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122.

It is to be understood that an example client device or other machine/computer may include fewer or more features than shown on the system 100 of FIG. 1. In any case, it is to be understood at least based on the foregoing that the system 100 is configured to undertake present principles.

Figure 2:
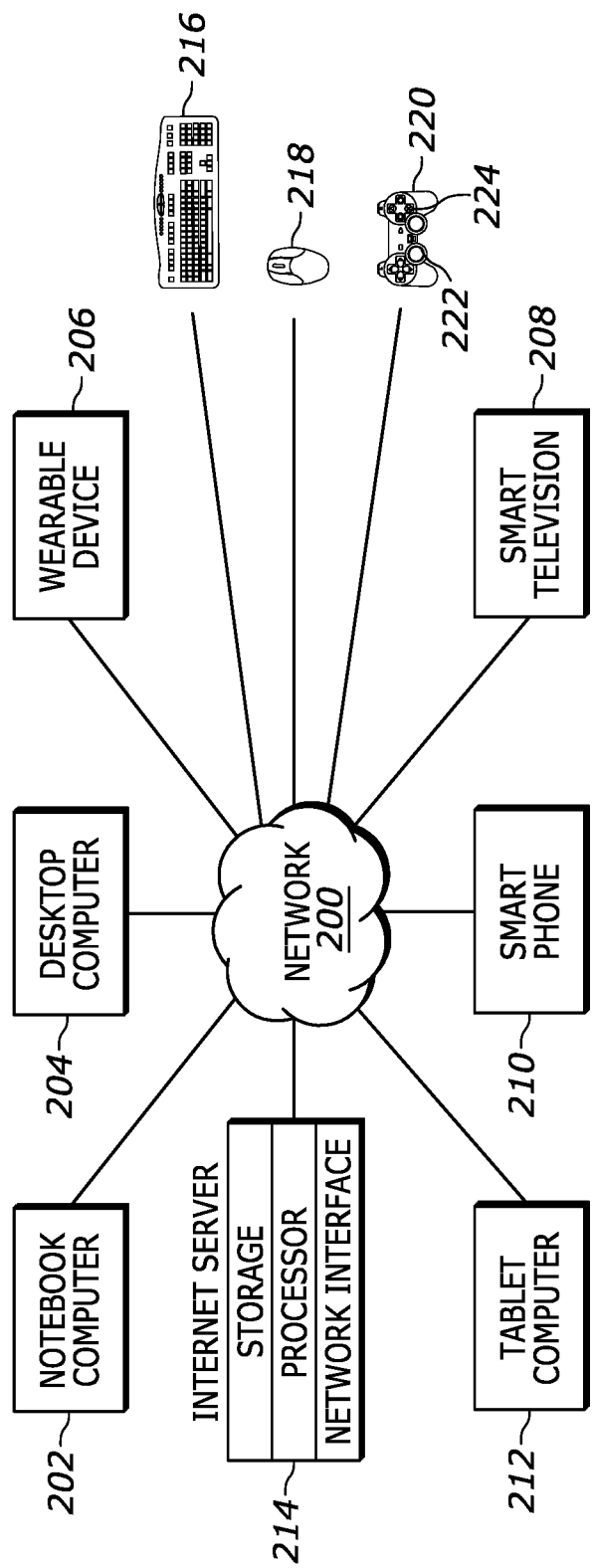
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a keyboard 216, a mouse 218, a video game controller 220, and a server 214 such as an Internet server that may provide cloud storage accessible to the devices 202-212, 216-220. It is to be understood that the devices 202-220 are configured to communicate with each other over the network 200 to undertake present principles.

Further describing the video game controller 220, note that in certain examples it may include a joystick 222 for controlling movement of a video game character and taking other actions. The controller 220 may also include one or more depressable buttons 224 also for controlling a video game character and taking other actions to participate in a video game.

Figure 3:
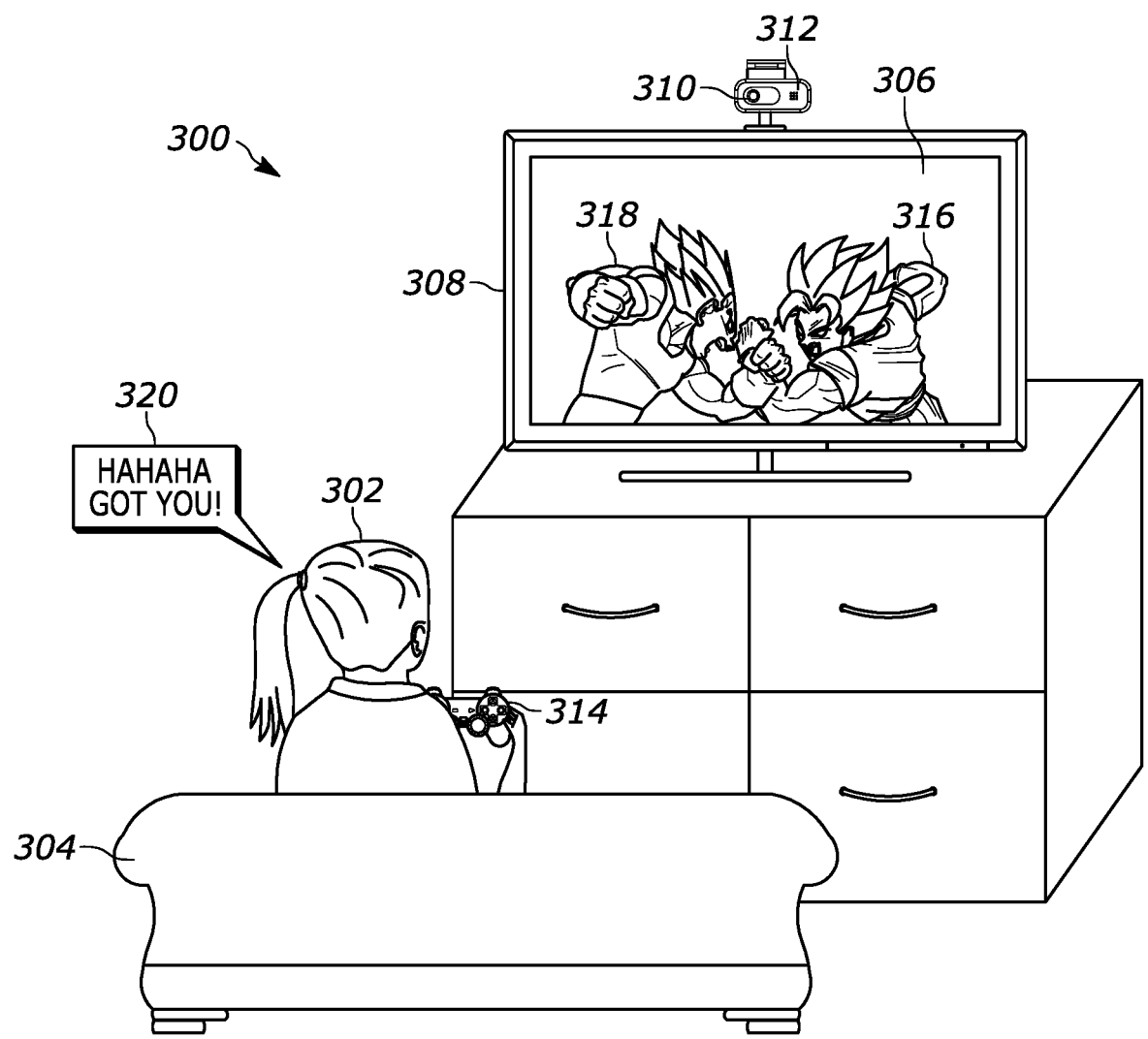
FIG. 3 is an example illustration of a person playing a video came in accordance with present principles.

Now in reference to FIG. 3, an example illustration of a residential environment 300 of a particular human video game player 302 is shown. As depicted in FIG. 3, the player 302 is sitting on a couch 304 while playing a video game 306 presented using a television display 308 and its associated speakers (not shown), possibly under control of a video game console (also not shown) or other device such as the television display 308 itself and/or a remotely-located server. The television display 308 may also include a camera 310 to collect images or video of the player 302 while playing the game 306, as well as a microphone 312 to collect audio from the player 302 while playing the game 306.

As also shown in FIG. 3, the player 302 is using a video game controller 314 to execute a kill shot using a first video game character 316 controlled by the player 302 via the controller 314. Note that only the arm of the character 316 is shown on the television display 308 as the game is being presented from the point of view of the character 316 himself. As shown, the kill shot is directed in the video game 306 to a second video game character 318 that is an opponent of the player 302 and/or character 316. The character 318 may controlled by another human player located in the environment 300 or remotely from the environment 300. Or, the character 318 may be controlled by a computer that is executing the video game 306 itself and thus is not under control of another human being.

As also shown in FIG. 3, upon landing the kill shot on the character 318, the player 302 may exclaim "Ha ha ha. I got you!" as illustrated by speech bubble 320. The microphone 312 may detect this exclamation, and in response the device executing the game 306 and/or an associated device may store audio data of this exclamation and associate it with one or more other pieces of data, such as video game video of the kill shot being performed, video collected by the camera 310 showing the player 302 while landing the kill shot, and data indicating the inputs of the player 302 using the controller 314 to land the kill shot.

More than one video clip may be curated by using such data and associations. The curated video clips may then be presented to the player 302 and others for searching and viewing in a straightforward manner, as depicted in FIG. 4.

Specifically, FIG. 4 shows an example graphical user interface (GUI) 400 that may be presented on a display of a computing device, such as the television 308, a smartphone of the player 302, or the display of another device. In some examples, the GUI 400 and its associated video clips may be stored in a cloud storage location somewhere where they may be accessed publicly by others over the Internet.

As shown, the GUI 400 relates to a video game titled "Zombie Invasion". Should a user wish to view curated video game clips for other games, the user may direct touch or cursor input to selector 402 to cause another menu to be presented from which the user may select another video game for which a similar GUI of curated video clips may be presented.

As also shown, the GUI 400 may include one or more columns for searching amongst the video clips for "Zombie Invasion". The clips themselves may be represented in column 404 by thumbnail screen shots 406 of a frame of the respective clips. Each thumbnail screen shot 406 may be selected via touch or cursor input to initiate playback of the associated video clip itself.

Each of the ensuing columns to be described may be searchable by selecting the respective title of the column itself shown at the top of the column (e.g., "time/date", "player", "location", etc.). In response to selection of the respective title, the shots 406 may then be reorganized in column 404 in a particular manner based on the sorting for the respective other column that is selected. For instance, shots 406 may be organized top to bottom in reverse chronological order as shown in column 408 based on selection of the title "time/date" 409 for the column 408. As another example, shots 406 may be organized top to bottom by human video game player according to alphabetical order of the first character of the respective player's name based on selection of the title "player" 411 for the column 410, though this sorting is not shown in FIG. 4 since, in the example shown, the shots 406 have already been ordered top to bottom in column 404 in reverse chronological order.

As still another example, shots 406 may be organized top to bottom by geographical location and/or a user-designated location name based on selection of the title "location" 413 for the column 412. Example geographical locations within the state of North Carolina are shown in the GUI 400, as well as example user-designed location names associated with geographical locations such as "David's house". In some implementations, the shots 406 may be sorted top to bottom based on selection of the title "location" 413 for the column 412 in alphabetical order of a first character of the location name.

The GUI 400 also shows that a column 414 may be presented. The column 414 may pertain to "kill shots", which may be video game character attacks or attack patterns that resulted in a video game opponent being killed in the video game. As shown, the column 414 may indicate particular types of kill shots, as well as a particular video game character or type of character that was killed for the "Zombie Invasion" video game. As an example, an entry in column 414 may indicate a kill shot to an opponent's head or chest, where the opponent may be a video game "boss" (e.g., lead character or character encountered at the end of a level or the game itself). The opponent may also be a minion of the boss. "Not applicable" entries may also be indicated for shots 406 and associated videos that do not show a kill shot, and may further indicate in some examples that the respective shot 406 actually shows the associated video game player indicated in column 410 as losing to a video game opponent. Based on selection of the title "kill shot" 415 at the top of column 414, the shots 406 may be organized top to bottom according to an alphabetical order of the first character of the respective name of the kill shot as indicated in column 414.

The GUI 400 may also include a column 416. The column 416 may pertain to similar input combinations provided by a respective player listed in column 410 via an input device used to play the video game "Zombie Invasion". The input combinations may include inputs to a joystick on a video game controller as well as inputs to buttons on the video game controller, a keyboard, a mouse, or whatever other input device might be used to play the video game.

A sequence may be determined, for instance, based on game data accompanying the video game indicating that a single character move or particular action is to be executed based on a particular sequence of plural inputs. A sequence may also be determined based on identification of the player as practicing a particular input combination a threshold number of times greater than one while waiting for the game to load or for a particular level to load. Then the device executing the video game may identify the input sequence during gameplay based on the inputs of the sequence being received in the specified sequence all within a threshold non-zero time of each other. The threshold time may be specified by the game developer or other person or entity.

Furthermore, note that in some examples input sequences may be identified as similar and hence indicating the same input combination based on an artificial intelligence engine or other computer program determining similarity of input sequences within a threshold tolerance. The threshold tolerance may be used since, for example, not every joystick movement might be precisely the same each time the respective player executes a particular input combination at least in part using the joystick.

As shown in FIG. 4, boxes in the column 416 may indicate respective directional inputs 418 of a particular input sequence using arrows in certain directions to indicate joystick or arrow key inputs in those respective directions as part of the respective combination. Boxes in column 416 may also indicate certain button inputs 420 of the sequence by indicating the respective button itself (e.g., an "A", "B", or "C" button as shown). Similar button combinations may then be listed or grouped together in the column 416 based on selection of the title 417 to sort the shots 406 by listing shots top to bottom consecutively that all indicate the same input sequence. One or more listing parameters may be used for which group of shots to list first, such as listing combinations with initial "up" directional inputs first at the top of the column 416, then combinations with initial "down" directional inputs below that, then combinations with initial "right" directional inputs below that, then combinations with initial "left" directional inputs below that, then combinations with initial "A" button inputs below that, then combinations with initial "B" button inputs below that, then combinations with initial "C" button inputs below that, and so on.

Still in reference to FIG. 4, the GUI 400 may also include a column 422. The column 422 may allow for searching or sorting of the shots 406 and hence corresponding video clips based on other categories or types of highlights besides kill shots. For example, other categories of highlights might include wins where a player from column 410 prevails over a video game opponent, win celebrations the player might do after winning against a video game opponent, amusing or funny moments that might have occurred during gameplay, moments of positive exclamations (e.g., "David can't contain himself" because of happiness in beating a certain opponent or level), moments of negative exclamations (e.g., "John throws his controller down" because of frustration in not being able to beat a certain opponent of level), etc. In this respect, note that in some examples the respective shots 406 may be selectable to initiate playback not only of video clips of the gameplay itself but also associated video clips showing the player himself or herself while playing the video game as might have been collected, e.g., using the camera 312 described above.

Another example of a category of highlights may be high-action sequences where the respective player is involved in performing a threshold non-zero number of moves using his or her video game character all within a threshold time of each other. In fact, FIG. 4 shows a sub-category of that where it indicates a high-action loss to a video game opponent in particular.

The moves or move sequences from gameplay that result in these types of highlights may be identified and categorized by an artificial intelligence categorization engine. The engine may have been built by the video game's developers, by the developers of the underlying video game system itself (e.g., XBOX®), etc. and may have been built using training data in supervised or unsupervised fashion to identify and categorize certain events indicated in video game streams. The highlights indicated in column 422 may be sorted and grouped consecutively from top to bottom in the column 422 based on selection of the title 423 and listed in alphabetical order of the first character of the respective highlight category or type.

Column 424 indicates yet another way to search video clips related to gameplay of the game "Zombie Invasion". Column 424 pertains to montages that were generated from multiple, separate video clips generated at different points of time during gameplay that have been combined together to form a respective montage of continuous video based on the commonality of the respective video clips. Note that the text for each entry in column 424 may itself be a selectable link to initiate playback of the respective montage that was generated. Also note that each separate video clip associated with the respective shot 406 as listed in column 404 may form part of the respective montage indicated in column 424 for the same respective row.

Thus, for instance, the "play all similar" link in the first row for column 424 may be selected to play a video montage of head kill shots of the same boss as indicated in column 415. Other options may include a "play best of" option where the best respective video clips of a respective type may be grouped as a montage and presented (as might have been determined using artificial intelligence software), as well as a "play all head kill shots from this week" option to initiate playback of a montage of all head kill shots performed by a particular player within the specified time frame. Other example montages may relate to chest shots where the player used his or her video game character to strike an opponent in the chest, as well as montages of frustrating moments endured by a certain player and montages of all video clips in which a particular input combination was performed by the player. The respective montages in each row may then be grouped together, top to bottom, in alphabetical order of the first character of the montage type based on selection of the title 425.

The GUI 400 may include still other columns providing other ways to search video clips associated with the respective screen shots 406. For instance, a column 426 may be presented for searching other attacks that might have been performed by a respective player other than a kill shot attack. Note that where kill shots are indicated for the respective video clip in column 414, a simple "not applicable" indicator may be presented in column 426 for the same shot 406. But for non-kill shots, the type of non-kill shot attack may be listed. For example, the attack may be an attack striking the leg of a video game opponent or a double face punch that does not end up killing the opponent. These attacks may be sorted based on selection of the title 427, top to bottom, in alphabetical order of the first character of the first word listed for each entry in this column.

Still further, in some embodiments the GUI 400 of FIG. 4 may include a custom search feature 428 where a user may enter search parameters or keywords into input box 430. These parameters or keywords may then be fed into an artificial intelligence model that may then use them to identify all video clips that might conform to the parameter (s) or be associated with the keyword(s). Those video clips may then be listed as part of the GUI 400 or as part of a separate GUI for the user to peruse them and select them for playback. The parameters or keywords may be user-defined, and/or they may correspond to the titles for each column discussed above.

Figure 5:
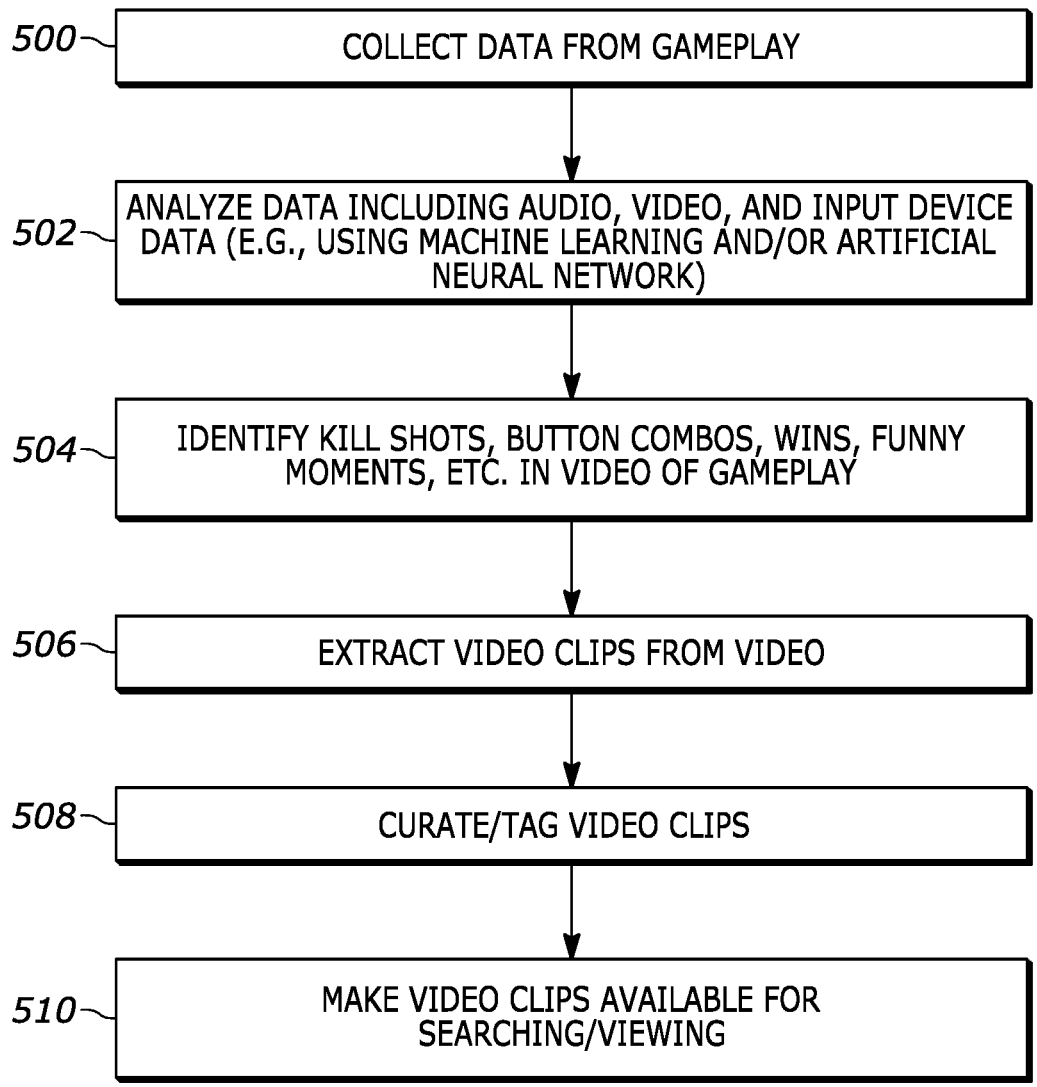
FIG. 5 is a flow chart of an example algorithm for a device to curate gameplay videos and other data in accordance with present principles.

Referring now to FIG. 5, it shows example logic that may be executed by a device such as the system 100, a video game console, a server, etc. consistent with present principles for curating video game-related videos for searching and viewing. In some examples, the logic of FIG. 5 may be executed in conjunction with use of an artificial intelligence model that may classify various video clips of gameplay, such as the model 600 of FIG. 6 that will be described later.

Beginning at block 500, the device may collect data during gameplay of a particular video game. Then at block 502 the device may analyze the data, which may include audio data indicating words and sounds made by a particular video game player while playing the video game, video data indicating actions and mannerisms of the particular video game player while playing the video game, and input device data indicating various inputs that the player provided via a controller, keyboard, etc. to play the video game. As shown for block 502, this analysis may be performed using machine learning and/or an artificial neural network of the model referenced above.

From block 502 the logic may then proceed to block 504 where the device may, based on the analysis of block 502, identify or classify consecutive frames of video of the gameplay as respective video clips indicating kill shots, particular button combinations, wins against video game opponents, funny moments, etc. and then extract those video clips from the stored video at block 506. The identification or classification may be performed using the machine learning or artificial neural network described above. Additionally or alternatively, the identification/classification may be performed using object recognition software and/or using action recognition software (e.g., to identify kill shots and other moves), using voice recognition software and sentiment classification (e.g., to identify exclamations, laughter, etc.), based on identifying a certain predefined input sequence as being executed as indicated in the input data, etc. Also note that the corresponding gameplay audio for the respective video clip that indicates sounds from the video game may also be included in each extracted video clip, as well as audio from the player himself or herself as detected by a microphone. The audio from the player may be merged with the gameplay audio and included as part of an extracted video clip.

The logic may then move to block 508 where the device may curate and tag the extracted video clips based on the identifications or classifications. For example, the classifications themselves may be used as searchable tags for the video clips, e.g., kill shots or even head kill shots in particular that are tagged in metadata for the respective clips.

From block 508 the logic may then proceed to block 510 where the device may make the video clips (or even still pictures) available for searching and viewing. For example, the device may store the video clips and their respective tags and other metadata at a storage location accessible to one or more video game players, and even the public at large. The device may also make a GUI like the GUI 400 of FIG. 4 available for searching and viewing of the video clips, such as through an online website or portal, through a video game service, through a mobile device application, etc.

Figure 6:
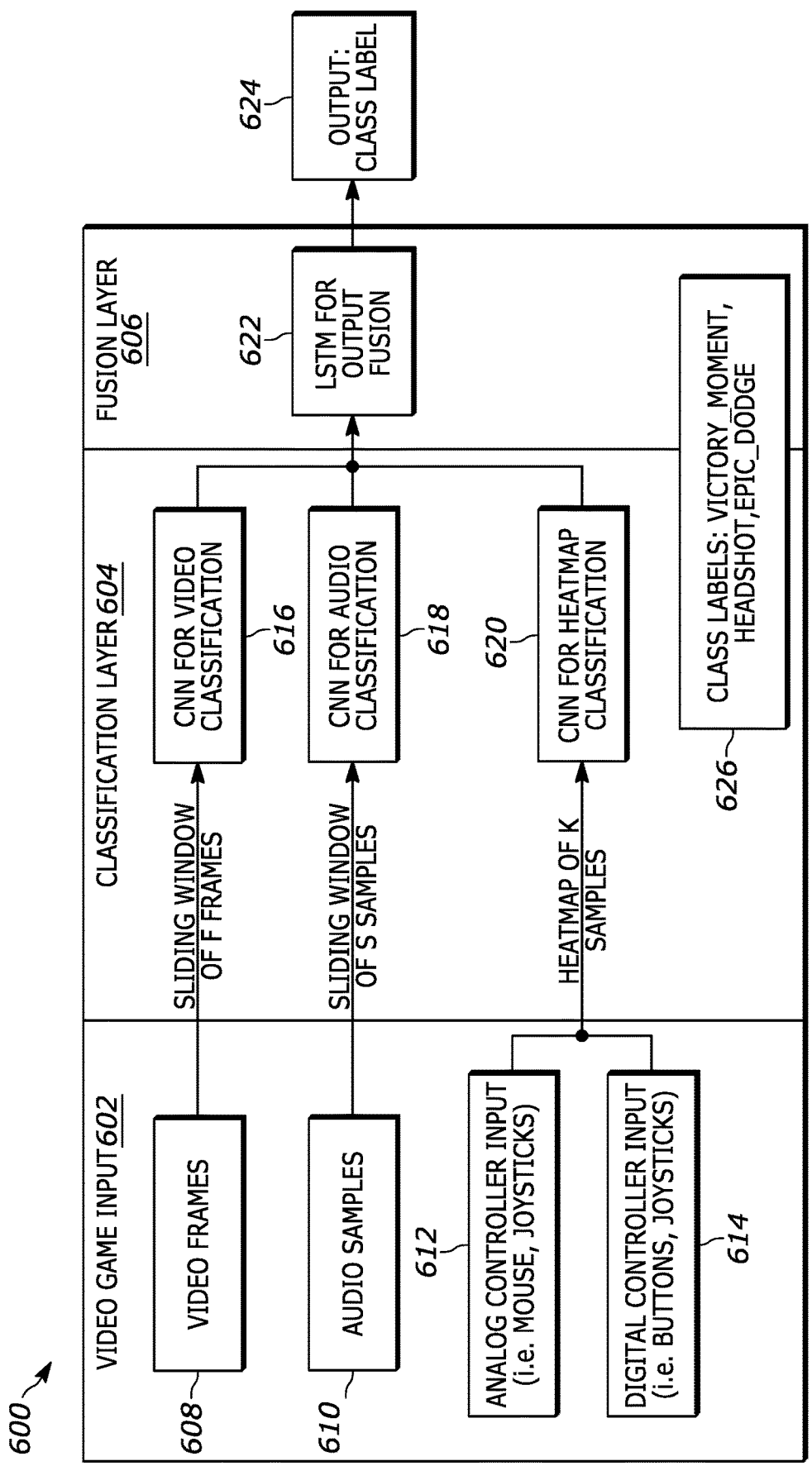
FIG. 6 shows example artificial intelligence architecture that may be used in accordance with present principles.

Now describing FIG. 6, it shows an example artificial intelligence architecture/model 600 which may be used by a device consistent with present principles. The architecture 600 may include various video game inputs 602, a classification layer 604, and a fusion layer 606.

First describing the video game inputs 602, they may be collectively synchronized or grouped based on the inputs all being related to a multimodal event such as a kill shot or other game event for which multiple different types of data are collected. Thus, the inputs 602 may include video frames 608 that may be image frames from gameplay involving the event as sampled at a particular frame rate such as a 60 Hz window size (and even video of the associated player while playing the video game). The inputs 602 may also include audio samples 610, which may be recordings of both audio from a microphone indicating words spoken by a player of the video game during the event, as well as audio from gameplay of the video game itself such as words spoken by video game characters and sounds generated by the characters and other sounds generated by the game itself during the event. The inputs 610 may be audio samples that are sampled at a particular rate such as a 16 KHz window size.

The inputs 602 may also include analog controller input 612 generated by input devices used by the player to play the video game during the event, such as mice, joysticks, video game controllers, keyboards, etc. The inputs 602 may also include digital controller input 614 generated by those input devices during the event. Both the inputs 612 and 614 may be user inputs that are sampled at a one KHz window size.

The classification layer 604 may take the inputs 602 and transform them into normalized data (e.g., using onehot encoding and binning) that can be fed into convolutional neural networks, which may be each trained with a single label determined by a developer that ties or links a multimodal event together.

As shown in FIG. 6 for the classification layer 604, a sliding window or stream of "F" frames of the video input 608 may be progressively fed into a convolutional neural network (CNN) 616 for video classification of the input 608. One example CNN that may be used for the CNN 616 is an Inception ConvNet CNN, though other CNNs for video classification that also have input and output layers as well as multiple hidden layers in between may also be used.

As also shown for the classification layer 604, a sliding window or stream of "S" samples of the input 610 may be progressively fed into another CNN 618 for audio classification of the input 610. Still further, a heatmap of "K" samples for the input device inputs 612, 614 may be progressively fed into a CNN 620 for heatmap classification. Output class labels 626 from outputs layers of the CNNs 616, 618, and 620 may then be fed as input into a long short-term memory (LSTM) recurrent neural network (RNN) 622 for output fusion. Example labels 626 include "victory_moment", "headshot", and "epic_dodge".

In some examples, during training, outputs from the CNNs 616, 618, 620 may be abstracted out using a softmax function for a respective hidden layer toward the end of each respective network 616, 618, 620. The respective hidden layer may be selected from each of the CNNs 616, 618, 620 by a developer and may be a layer just before the output classification layer, e.g. a hidden layer one or two layers before the output classification layer. So, for instance, this hidden layer may be established by a matrix of weights that comes before the final label "decision" step of the output layer. Thus, each of the CNNs 616, 618, and 620 may be trained to predict the same class label independent of the other networks 616, 618, 620.

Output fusion may then occur at the fusion layer 606 using the LSTM RNN 622 to render an output class label 624 based on the fusion for a given window of gameplay, which may then be used for searching and curating of corresponding screenshots and video (e.g., video used as part of the input 602) consistent with present principles. The window may be as big or small as warranted, e.g., as specified by a developer. The RNN 622 may even maintain a memory of the various inputs to it over time so that the final decision of the class may have a temporal weight. Specifically, the probability of a class label may not be independent at every time step so if at a previous time step the model 600 put out "victory_moment" as a label, then at the next time step "victory_moment" may be heavily expected to be the next label again, and thus the label may decay as the model 600 gains more evidence that this label is correct or not.

Figure 7:
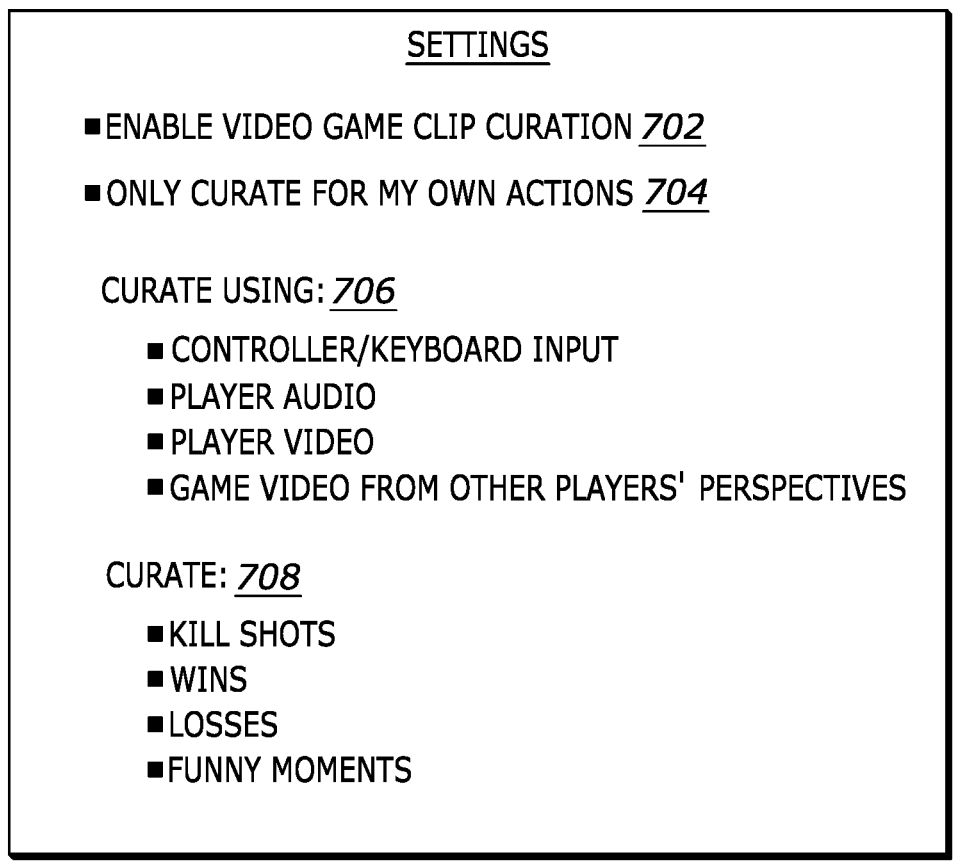
FIG. 7 shows an example graphical user interface (GUI) for configuring settings of a device in accordance with present principles.

Now describing FIG. 7, it shows an example settings GUI 700 that may be presented on the display of a video game player's device for configuring settings of a system configured to undertake present principles. Each setting or option to be described below may be selected by directing touch or cursor input to the adjacent check box.

Thus, the GUI 700 may include a first setting 702 that is selectable to configure the user's device or another device operating consistent with present principles to undertake the actions described herein to identify and curate video clips for searching and viewing. For instance, the setting 702 may be selected to set or enable a device to present the GUI 400 of FIG. 4, to undertake the logic of FIG. 5, and/or to use the architecture of FIG. 6.

The GUI 700 may also include a setting 704 that is selectable to enable or set the device to only curate and present video clips to a particular user of that particular user's own actions during gameplay and not the actions of any other players. Thus, the GUI 400 of FIG. 4 may be tailored to a particular user in this example.

The GUI 700 may also include various other options 706 for selecting various types of data to use for video clip curation. These types of data may include controller or keyboard input, audio of the player as he or she plays the game (as opposed to audio of the game itself), video of the player as he or she plays the game (as opposed to video of the game itself), and video of the game itself but from the virtual perspective of another player of the video game as might be presented on the display of another player's device that might be playing the video game as that character. This video from the virtual perspective of another player/character may then be included in a video or video montage that may be selected for playback based on manipulation of the GUI 400.

The GUI 700 may further include various options 708 to specify types of video clips of gameplay to curate. This may include video clips identified as indicating kill shots, wins over video game opponents, losses against video game opponents, and funny or amusing moments during gameplay.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   analyze a user's gameplay of a video game; and
   generate one or more searchable video clips based on the user's gameplay;
   wherein the analysis of the user's gameplay of the video game comprises analysis of audio from the user detected via a microphone, and wherein at least one of the searchable video clips is generated based on identification from the audio of one or more of: laughter, a positive exclamation by the user, a negative exclamation by the user.

2. The device of claim 1, wherein the analysis of the user's gameplay of the video game comprises analysis of user inputs received via an input device, and wherein the instructions are executable to:
   analyze the user inputs received via the input device by associating similar input sequences that are identified from the user inputs; and
   make video clips of the similar sequences searchable by input sequence.

3. The device of claim 2, wherein each similar input sequence comprises plural inputs received within a threshold non-zero time of each other.

4. The device of claim 1, wherein at least one of the searchable video clips is generated based on identification from the audio of laughter.

5. The device of claim 1, wherein at least one of the searchable video clips is generated based on identification from the audio of a positive exclamation by the user.

6. The device of claim 1, wherein at least one of the searchable video clips is generated based on identification from the audio of a negative exclamation by the user.

7. The device of claim 1, wherein at least one of the searchable video clips comprises video from the perspective of a first video game character different a second video game character controlled by the user.

8. The device of claim 7, wherein the first video game character is a character controlled by another person besides the user.

9. The device of claim 1, wherein the one or more video clips are searchable by one or more of: attacking a particular area of an opponent's body, moments the user does not prevail against a video game opponent, amusing or funny moments.

10. The device of claim 1, wherein the one or more video clips are searchable by one or more of: montage of attacking a particular area of an opponent's body, montage of moments the user does not against a video game opponent, montage of amusing or funny moments.

11. A computer-implemented method, comprising:
analyzing, using a device, data of a user playing a video game; and
making video clips of the user's gameplay searchable based on the analysis;
wherein at least one of the video clips comprises video from the perspective of a first video game character different a second video game character controlled by the user; and
wherein the analyzing of the data of the user playing the video game comprises analyzing audio from the user detected via a microphone, and wherein the method comprises making at least one of the video clips searchable based on identification from the audio of one or more of: laughter, a positive exclamation by the user, a negative exclamation by the user.

12. A computer readable storage medium (CRSM) that is not a transitory signal, the computer readable storage medium comprising instructions executable by at least one processor to:
analyze a user's gameplay of a video game; and
generate one or more searchable video clips based on the user's gameplay;
wherein at least one of the searchable video clips comprises video from the perspective of a first video game character different a second video game character controlled by the user; and
wherein the analysis comprises analysis, using at least one artificial neural network, of similar player input sequences to an input device, and wherein the searchable video clips are grouped together by similar player input sequence.

13. The computer-implemented method of claim 11, wherein the first video game character is a character controlled by another person besides the user.

14. The computer-implemented method of claim 11, wherein at least one of the video clips is made searchable based on identification from the audio of laughter.

15. The computer-implemented method of claim 11, wherein at least one of the video clips is made searchable based on identification from the audio of a positive exclamation by the user and/or a negative exclamation by the user.

16. The CRSM of claim 12, wherein the analysis of the user's gameplay of the video game comprises analysis of audio from the user detected via a microphone, and wherein at least one of the searchable video clips is generated based on identification from the audio of one or more of: laughter, a positive exclamation by the user, a negative exclamation by the user.

17. The CRSM of claim 16, wherein at least one of the searchable video clips is generated based on identification from the audio of laughter.

18. The CRSM of claim 16, wherein at least one of the searchable video clips is generated based on identification from the audio of a positive exclamation by the user and/or a negative exclamation by the user.

19. The computer-implemented method of claim 11, wherein the analyzing comprises analyzing, using at least one artificial neural network, similar player input sequences to an input device, and wherein the video clips are made searchable by similar player input sequence.

* * * * *